Figure 1:
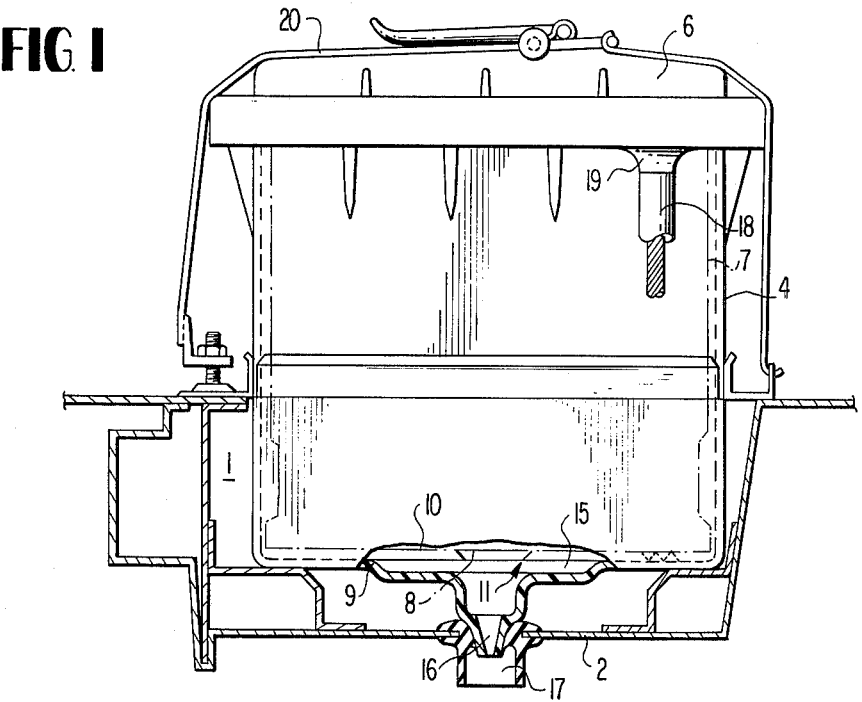

United States Patent [19]

Reinhard et al.

[11] 4,098,366
[45] Jul. 4, 1978

[54] DEVICE FOR MOUNTING A STORAGE BATTERY

[75] Inventors: Theodor Reinhard, Böblingen; Ernst Haug, Sindelfingen; Manfred Schulz, Gültlingen, all of Fed. Rep. of Germany

[73] Assignee: Daimler-Benz Aktiengesellschaft, Fed. Rep. of Germany

[21] Appl. No.: 726,561

[22] Filed: Sep. 27, 1976

[30] Foreign Application Priority Data

Sep. 27, 1975 [DE] Fed. Rep. of Germany ....... 2543308

[51] Int. Cl.² .............................................. B62D 25/00
[52] U.S. Cl. .................................................. 180/68.5
[58] Field of Search ............... 180/68.5; 429/175, 176, 429/163, 179, 180

[56] References Cited

U.S. PATENT DOCUMENTS

| 2,094,329 | 9/1937 | Mascuch | 429/176 |
| 2,104,765 | 1/1938 | Saunders | 180/68.5 |

Primary Examiner—Joseph F. Peters, Jr.
Assistant Examiner—Gene A. Church
Attorney, Agent, or Firm—Craig & Antonelli

[57] ABSTRACT

An installation for accommodating a storage battery in a closed-off space, such as a passenger or luggage space of a motor vehicle, which includes a covering hood that holds back gases and acids escaping from the battery cells; the covering hood thereby forms the cover of a trough surrounding the storage battery and abuts sealingly at the top side of the trough so that a container is created which is gas-tight with respect to the interior of the vehicle; the connecting cables for the battery are led out of the container in a sealed manner while a recess with a discharge opening is provided in the bottom of the container which is in communication with the free atmosphere.

17 Claims, 2 Drawing Figures

DEVICE FOR MOUNTING A STORAGE BATTERY

The present invention relates to an installation for the accommodation of a storage battery within a closed-off space, for example, in a passenger or luggage space of a motor vehicle, with a covering hood that holds back gases and acids escaping out of the battery cells.

Coverings of this type as disclosed in the German Auslegeschrift 1,048,616, which abut sealingly at the top side of the storage battery or at the filler connections or filler caps thereof, are equipped with upwardly disposed discharge openings for the resulting gases. Since, however, under unfavorable conditions, also a discharge of acid or a condensation of escaping acid vapors may occur, acid may collect under the covering. If the covering abuts sealingly at the top side of the storage battery, then the collected acid will flow uncontrolled over the outer walls of the storage battery, when lifting off the covering, and attacks the adjoining body parts. Also with coverings which abut sealingly at the filler connections or filler caps of the storage battery and thus form a collecting container, it may lead to an undersired outflow of acid when the removed covering is laid aside carelessly.

It is therefore the aim of the present invention to so accommodate a storage battery within a closed-off spaced, for example, within a passenger or luggage space, while avoiding the aforementioned disadvantages, that any resulting gases cannot reach this space, and that also with the removal of the covering no uncontrolled discharge of acid occurs.

This is achieved according to the present invention if the covering hood forms the cover of a trough surrounding the storage battery, which cover abuts sealingly at the top side of the trough and thus a container is created which is gas-tight with respect to the vehicle interior, through which the connecting cables are led-out in a sealed manner, and if a recess with a discharge opening is provided in the bottom of the container which is in communication with the free atmosphere.

It is already known from the German Gebrauchsmuster 7,130,160 to accommodate a storage battery in a box closed-off by a cover. However, the covers or caps of the cells extend thereby through the cover in this Gebrauchsmuster and the gases and acids can therefore escape unobstructedly.

A self-centering accommodation of the storage battery can be achieved according to the present invention if ribs project inwardly from at least two mutually oppositely disposed side walls of the trough, whose front faces extend approximately parallel to the side walls within the lower area thereof and then upwardly obliquely with respect to these side walls in the adjoining upper area thereof.

It is appropriate for the unobstructed discharge of escaping gases and acids if the bottom of the trough is provided with a number of raised portions, such as, for example, interrupted web-rows, on which rests the bottom side of the storage battery.

It is of particular advantage if the discharge opening is constructed as funnel which is supported in a self-centering manner on a further discharge funnel accommodated in a body part.

In a preferred embodiment of the present invention, the container is received by and accommodated in a hollow space of the body and the cover is pressed against the trough top side by at least one clamping band pivotally connected at fixed body parts.

Accordingly, it is an object of the present invention to provide an installation for the accommodation of a storage battery within a closed-off space, which avoids by simple means the aforementioned shortcomings and drawbacks encountered in the prior art.

Another object of the present invention resides in an installation for the accommodation of a storage battery which effectively prevents the spilling of acids over parts of the hollow space.

A further object of the present invention resides in a mounting arrangement for storage batteries, especially in motor vehicles, which far-reachingly protects exposed parts against attack by acids escaping from the battery or condensed from escaping acid vapors.

Still a further object of the present invention resides in an installation for accommodating a storage battery within a closed-off space in such a manner that any resulting gases cannot reach the space and that no uncontrolled discharge of acid occurs when the cover for the space is removed.

Another object of the present invention resides in a self-centering accommodation of storage batteries within an enclosed space which facilitates the installation of the storage battery.

Figure 2:
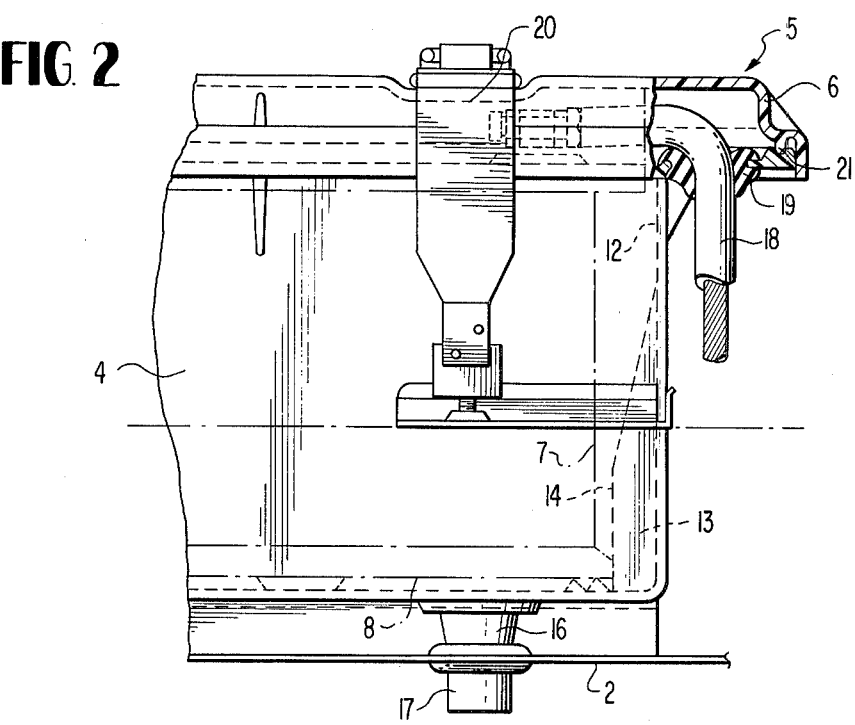

These and other objects, features and advantages of the present invention will become more apparent from the following description when taken in connection with the accompanying drawing which shows, for purposes of illustration only, one embodiment in accordance with the present invention, and wherein:

FIG. 1 is a cross-sectional view through an accommodation for a storage battery and the arrangement thereof within a hollow space of the body in accordance with the present invention; and FIG. 2 is a partial side elevational view of the arrangement illustrated in FIG. 1, as viewed from the right side thereof.

Referring now to the drawing wherein like reference numerals are used throughout the two views to designate like parts, a hollow space 1 of the vehicle body which is not illustrated in detail and which is delimited in the downward direction by a body part 2, accommodates a container 3 which is composed of a trough 4 and of a cover 6 closing off the trough 4 in the form of a hood generally designated by reference numeral 5. A storage battery indicated in dash and dotted lines is accommodated in the container 3 whose bottom side 8 rests on raised portions 11 projecting from the bottom 9 of the trough 4 in the form of interrupted web-rows 10.

For purposes of facilitated handling of the storage battery 7 and for the self-centering thereof during the insertion, two ribs 13 indicated in dash lines project inwardly from two mutually opposite side walls 12 (FIG. 2) of the trough 4, whose front faces 14 extend approximately parallel to the side walls 12 within the lower area thereof while these front faces extend upwardly obliquely with respect to the side walls in the adjoining upper area thereof.

A recess 15 with a discharge opening 16 is provided in the bottom 9 of the container 3, which is constructed as funnel and which is sealingly supported during the lowering of the trough 4, appropriately consisting of an impact-resistant synthetic resinous material, in a self-centering manner on a discharge funnel 17 inserted in the body part 2 and consisting of elastic material.

The connecting cables 18 of which only one is shown are led out of the trough 4 in a sealed manner under interposition of insulating cable lead-out means 19. During the emplacement of the cover 6 and the subsequent clamping of the clamping band or bands 20, the cover 6 which in its turn may consist of an impact-resistant material, is securely pressed against the trough top side 21 (FIG. 2) possibly by interposition of a seal. Preferably, however, the mutually abutting surfaces of the cover 6 and of the trough top side 21 are so constructed that the arrangement of a separate seal is not necessary. One obtains thereby a gas-tight container 3 whereby any resulting gases and acids are conducted away in the direction of its bottom 9 and are discharged into the free atmosphere by way of the discharge funnel 17.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An installation for the accommodation of a storage battery within a closed-off space, which comprises a covering hood means holding back gases and acids escaping out of the battery cells, characterized in that the covering hood means forms a cover for a trough means surrounding the storage battery, said cover abutting sealingly against the trough top side so that a container is produced which is gas-tight within the vehicle interior and which is only connected with the outside air via a discharge opening, said discharge opening being provided in a recess formed in the bottom of the container for conducting away said gases and acids.

2. An installation according to claim 1, with connecting cable means for the battery, characterized in that the connecting cable means extend sealingly through the container.

3. An installation according to claim 1, characterized in that rib means project inwardly from at least two mutually oppositely disposed side walls of the trough means, whose front faces extend approximately parallel to the side walls within the lower area thereof and obliquely upwardly with respect thereto in the upper area thereof.

4. An installation according to claim 3, characterized in that the bottom of the trough means is provided with a number of raised portions on which rests the bottom side of the storage battery.

5. An installation according to claim 4, characterized in that the raised portions are formed by interrupted web rows.

6. An installation according to claim 4, characterized in that the discharge opening is constructed as funnel means which is supported in a self-centering and sealing manner on a further discharge funnel accommodated in a body part.

7. An installation according to claim 6, characterized in that the container is received by a hollow space of the body and the cover is pressed against the trough top side by at least one pivotally connected clamping band pivotally connected at at least one fixed vehicle part.

8. An installation according to claim 7, characterized in that the closed-off space is the passenger space of a motor vehicle.

9. An installation according to claim 7, characterized in that the closed-off space is the luggage space of a motor vehicle.

10. An installation according to claim 7, with connecting cable means for the battery, characterized in that the connecting cable means extend sealingly through the container.

11. An installation according to claim 10, characterized in that the raised portions are formed by interrupted web rows.

12. An installation according to claim 1, characterized in that the bottom of the trough means is provided with a number of raised portions on which rests the bottom side of the storage battery.

13. An installation according to claim 12, characterized in that the raised portions are formed by interrupted web rows.

14. An installation according to claim 1, characterized in that the discharge opening is constructed as funnel means which is supported in a self-centering and sealing manner on a further discharge funnel accommodated in a body part.

15. An installation according to claim 1, characterized in that the container is received by a hollow space of the body and the cover is pressed against the trough top side by at least one pivotally connected clamping band pivotally connected at at least one fixed vehicle part.

16. An installation for the accommodation of a storage battery within a closed-off space, which comprises a covering hood means holding back gases and acids escaping out of the battey cells, characterized in that the covering hood means forms a cover for a trough means surrounding the storage battery, said cover abutting sealingly against the trough top side so that a container is produced which is gas-tight within the vehicle interior, and said container being provided with a recess having a discharge opening in the bottom of the container, which is in communication with the free atmosphere, and further characterized in that the discharge opening is constructed as funnel means which is supported in a self-centering and sealing manner on a further discharge funnel accommodated in a body part.

17. An installation for the accommodation of a storage battery within a closed-off space, which comprises a covering hood means holding back gases and acids escaping out of the battery cells, characterized in that the covering hood means forms a cover for a trough means surrounding the storage battery, said cover abutting sealingly against the trough top side so that a container is produced which is gas-tight within the vehicle interior, and said container being provided with a recess having a discharge opening in the bottom of the container, which is in communication with the free atmosphere, and further characterized in that rib means project inwardly from at least two mutually oppositely disposed side walls of the trough means, whose front faces extend approximately parallel to the side walls within the lower area thereof and obliquely upwardly with respect thereto in the upper area thereof.

* * * * *